US011999227B2

(12) United States Patent
Engerman et al.

(10) Patent No.: US 11,999,227 B2
(45) Date of Patent: Jun. 4, 2024

(54) ELECTRIC DRIVE AXLE WITH A GEARBOX AND GEARBOX OPERATING METHOD

(71) Applicant: Dana Automotive Systems Group, LLC, Maumee, OH (US)

(72) Inventors: Eric M. Engerman, Plymouth, MI (US); Andy Perakes, Canton, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/303,374

(22) Filed: Apr. 19, 2023

(65) Prior Publication Data

US 2023/0339315 A1 Oct. 26, 2023

Related U.S. Application Data

(63) Continuation of application No. 17/660,290, filed on Apr. 22, 2022, now Pat. No. 11,667,189.

(51) Int. Cl.
*F16H 37/08* (2006.01)
*B60K 1/00* (2006.01)
*B60K 17/08* (2006.01)
*F16H 61/682* (2006.01)

(52) U.S. Cl.
CPC ............... *B60K 17/08* (2013.01); *B60K 1/00* (2013.01); *F16H 37/082* (2013.01); *F16H 61/682* (2013.01); *B60K 2001/001* (2013.01); *F16H 2200/2007* (2013.01); *F16H 2200/2094* (2013.01)

(58) Field of Classification Search
CPC .... B60K 17/08; B60K 1/00; B60K 2001/001; F16H 37/082; F16H 61/682; F16H 2200/2007; F16H 2200/2094
See application file for complete search history.

(56) References Cited

U.S. PATENT DOCUMENTS

| | | | |
|---|---|---|---|
| 6,196,944 | B1 | 3/2001 | Schmitz |
| 9,950,607 | B2 | 4/2018 | Littlefield et al. |
| 10,018,259 | B2 | 6/2018 | Arnelöf |
| 2016/0003351 | A1 | 1/2016 | Park |
| 2019/0285175 | A1 | 9/2019 | Tanaka |

FOREIGN PATENT DOCUMENTS

| | | | | |
|---|---|---|---|---|
| CN | 109890642 A | * | 6/2019 | ............... B60K 1/00 |
| DE | 102017004898 A1 | | 11/2018 | |
| DE | 102017216305 A1 | * | 3/2019 | |
| DE | 102017222705 A1 | * | 6/2019 | ............. B60K 6/365 |
| DE | 102018200295 A1 | * | 7/2019 | ............. B60K 6/365 |

\* cited by examiner

*Primary Examiner* — Justin Holmes
(74) *Attorney, Agent, or Firm* — McCoy Russell LLP

(57) ABSTRACT

Methods and systems for an electric drive axle are provided. An electric drive axle, in one example, includes an electric machine rotationally coupled to a gearbox which includes a higher range planetary gear set coupled to a lower range planetary gear set via a clutch. The clutch is configured to selectively rotationally couple an input gear to a sun gear in each of the higher range planetary gear set and the lower range planetary gear set in different positions or selectively rotationally couple a carrier in the higher range planetary gear set to a carrier and a sun gear in the lower range planetary gear set in different positions.

19 Claims, 5 Drawing Sheets

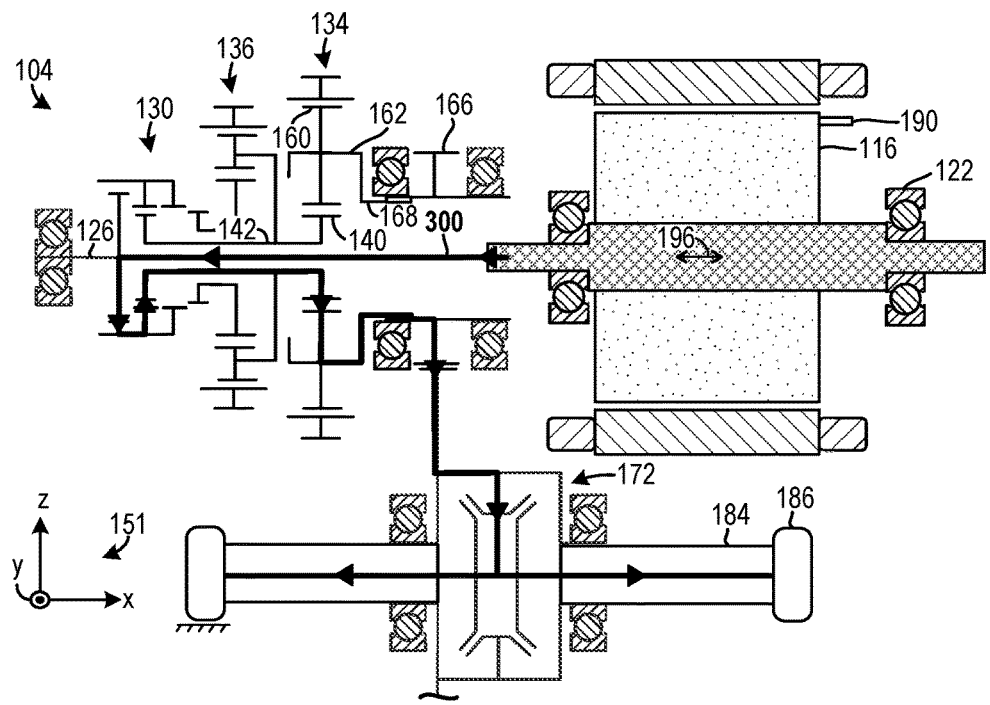
FIG. 3A
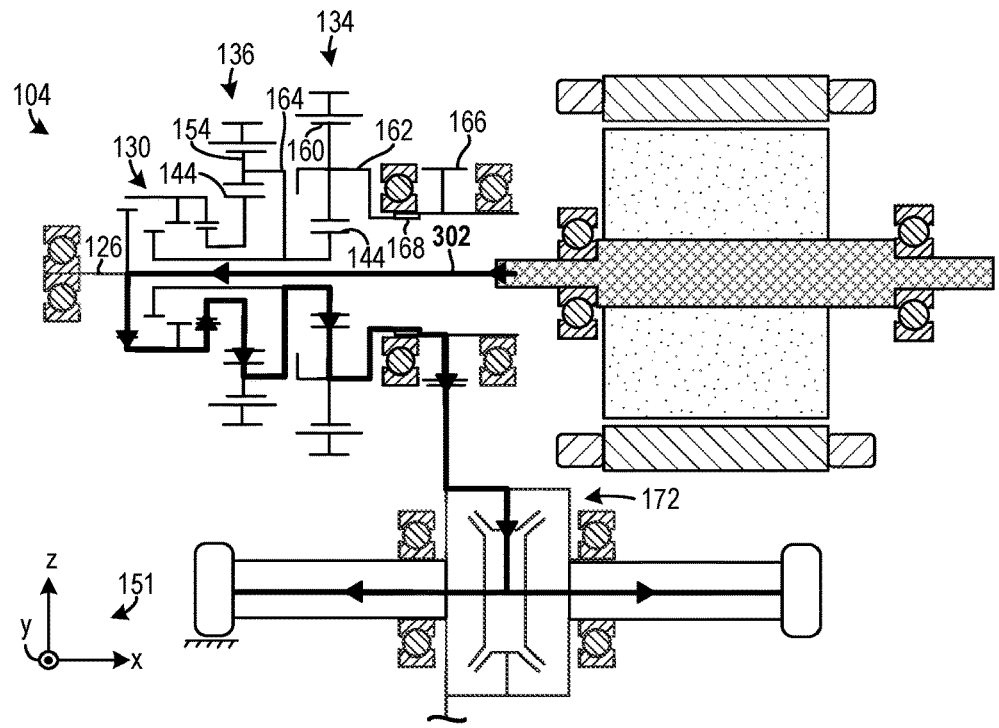
FIG. 3B
|  | Lower Range | Higher Range |
|---|---|---|
| Clutch (130) | *Higher range position* | *Lower range position* |
FIG. 3C

ELECTRIC DRIVE AXLE WITH A GEARBOX AND GEARBOX OPERATING METHOD

CROSS REFERENCE TO RELATED APPLICATION

The present application is a continuation of U.S. Non-Provisional patent application Ser. No. 17/660,290, entitled "ELECTRIC DRIVE AXLE WITH A GEARBOX AND GEARBOX OPERATING METHOD", and filed on Apr. 22, 2022. The entire contents of the above-listed application are hereby incorporated by reference for all purposes.

TECHNICAL FIELD

The present disclosure relates to an electric drive axle in a vehicle, and more particularly to a gearbox in an electric drive axle.

BACKGROUND AND SUMMARY

Certain internal combustion engine vehicles have a wide range of gear ratio demands. For instance, specific vehicles, such as sport utility vehicles, can have high and low range gear ratio demands. For instance, some combustion engine vehicles may have both high and low speed travel demands, to allow the vehicle to travel on roadways as well as in off-road environments, for example. Other vehicles may however demand closer separation between gears to enable smoother shifting operation. The inventor has recognized a desire to meet these demands when electrifying certain vehicles.

US 2016/0003351 A1 to Park teaches a two-speed transmission for an electric vehicle. The transmission utilizes both a friction clutch and a dog clutch to achieve the two speed operation. The inventor has recognized several drawbacks with Park's transmission as well as other previous transmissions. For instance, Park's transmission demands the use of two clutches to achieve the two speed operation which increases the complexity of transmission with regard to its structural architecture as well as control strategies.

To overcome at least some of the aforementioned challenges the inventor developed an electric drive axle. The electric drive axle includes, in one example, an electric machine rotationally coupled to a gearbox. The gearbox includes a higher range planetary gear set coupled to a lower range planetary gear set via a clutch. This clutch is designed to selectively rotationally couple an input gear to a sun gear in each of the higher range planetary gear set and the lower range planetary gear set in different positions or selectively rotationally couple a carrier in the higher range planetary gear set to a carrier and a sun gear in the lower range planetary gear set in different positions. In this way, the range functionality of the electric drive axle is expanded in a space efficient package. Consequently, the electric drive axle may be used in a wider number of vehicle platforms and therefore has greater customer appeal.

In another example, the electric drive axle may further include a controller that includes instructions stored in memory that when executed, during a first operating condition, cause the controller to operate the gearbox in a higher range mode where mechanical power from the electric machine flows through the lower range planetary gear set and the higher range planetary gear set in series. In such an example, the controller may further include instructions that when executed during a second operating condition cause the controller to operate the gearbox in a lower range mode where mechanical power from the electric machine bypasses the lower range planetary gear set and travels to the higher range planetary gear set. In this way, the gearbox may be controlled to operate in a lower range where power travels through both the higher and lower range planetary gear sets and in a higher range where power bypasses the lower range planetary gear set. Consequently, the drive axle achieves high and low range gearbox functionality in a space and energy efficient package.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 3A-3B show power paths for different operating ranges of the electric drive axle, depicted in FIG. 1.

FIG. 3C shows a table that indicates the configuration of the gearbox clutch in the different operating ranges, shown in FIGS. 3A and 3B.

DETAILED DESCRIPTION

An electric drive axle that includes a gearbox with a space efficient package that achieves higher and lower range operation using a clutch. The electric drive axle includes an electric motor and a clutch designed to direct power from the motor through one or both of a higher range planetary gear set and a lower range planetary gear set, in different operating configurations. Designing the electric axle with the higher and lower range planetary gear sets enables the axle's functionality to be expanded in a compact and space efficient manner, thereby increasing customer appeal.

Figure 1:
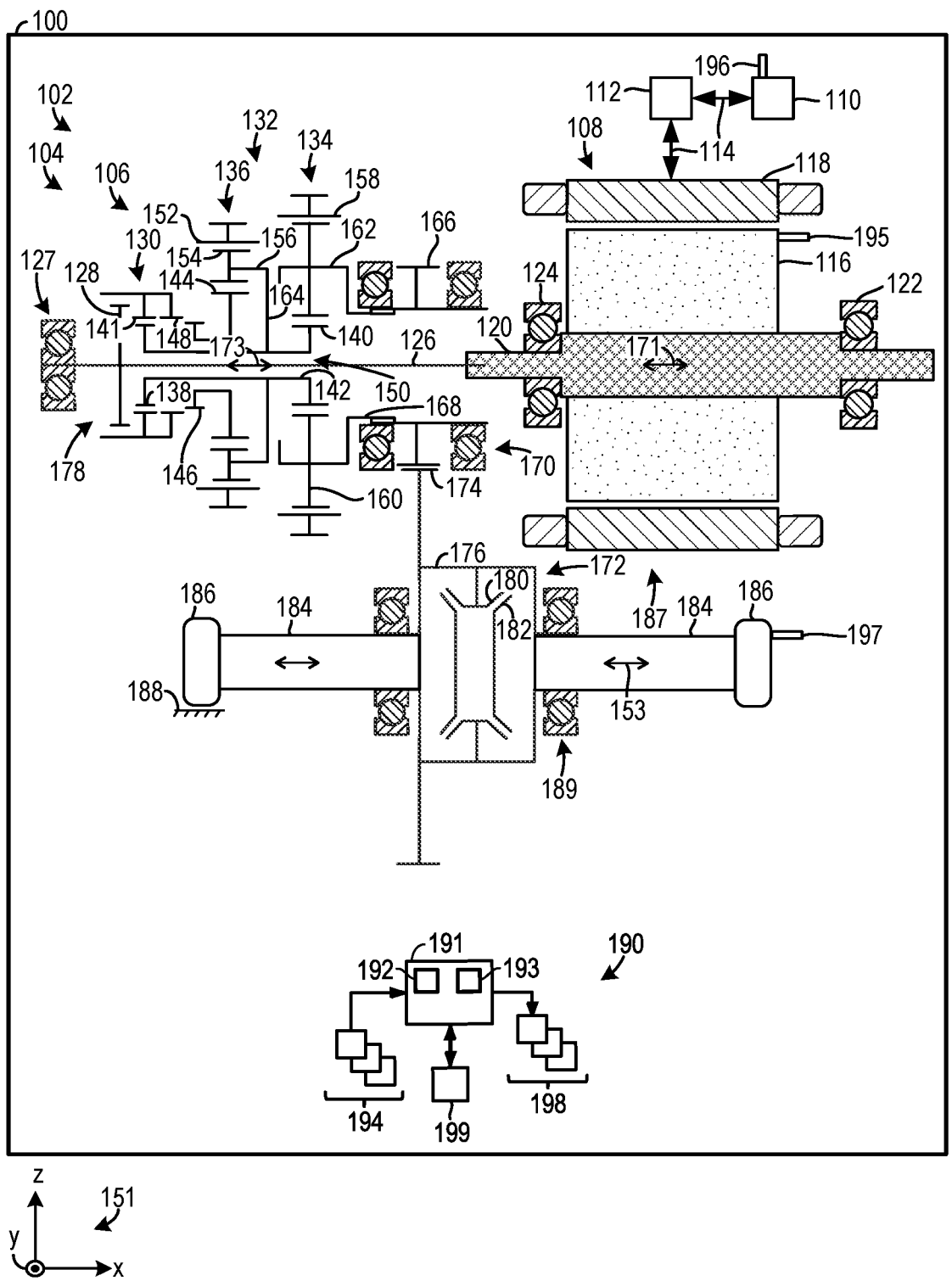
FIG. 1 shows a schematic representation of a vehicle that includes a first example of an electric drive axle.
Figure 2:
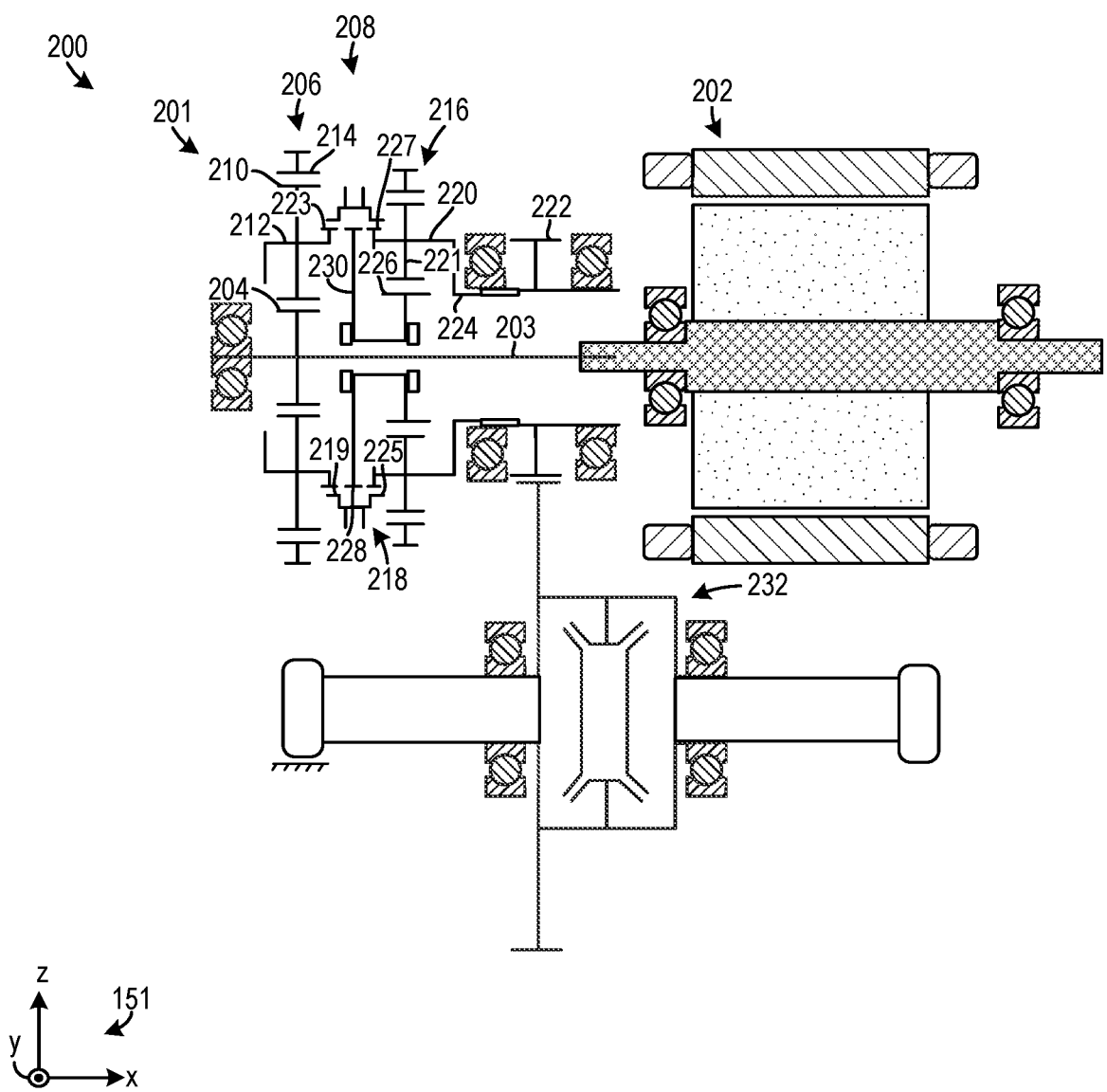
FIG. 2 shows a schematic representation of a second example of an electric drive axle.
Figure 4A:
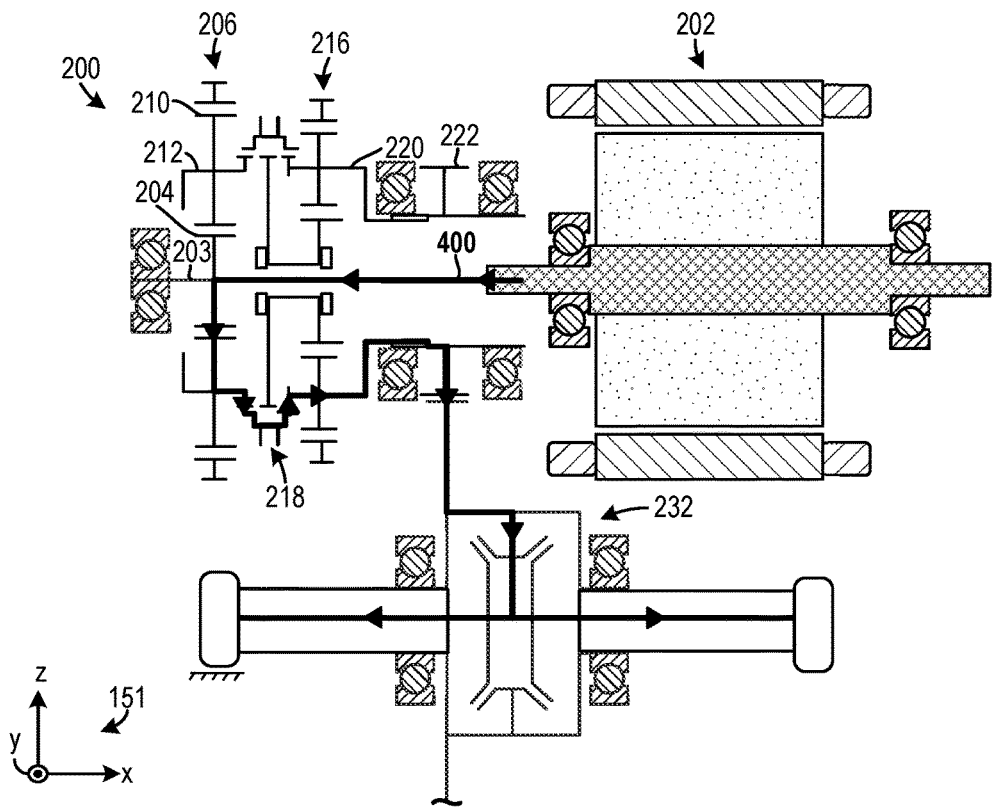
FIGS. 4A-4B show power paths for different operating ranges of the electric drive axle, depicted in FIG. 2.
Figure 4B:
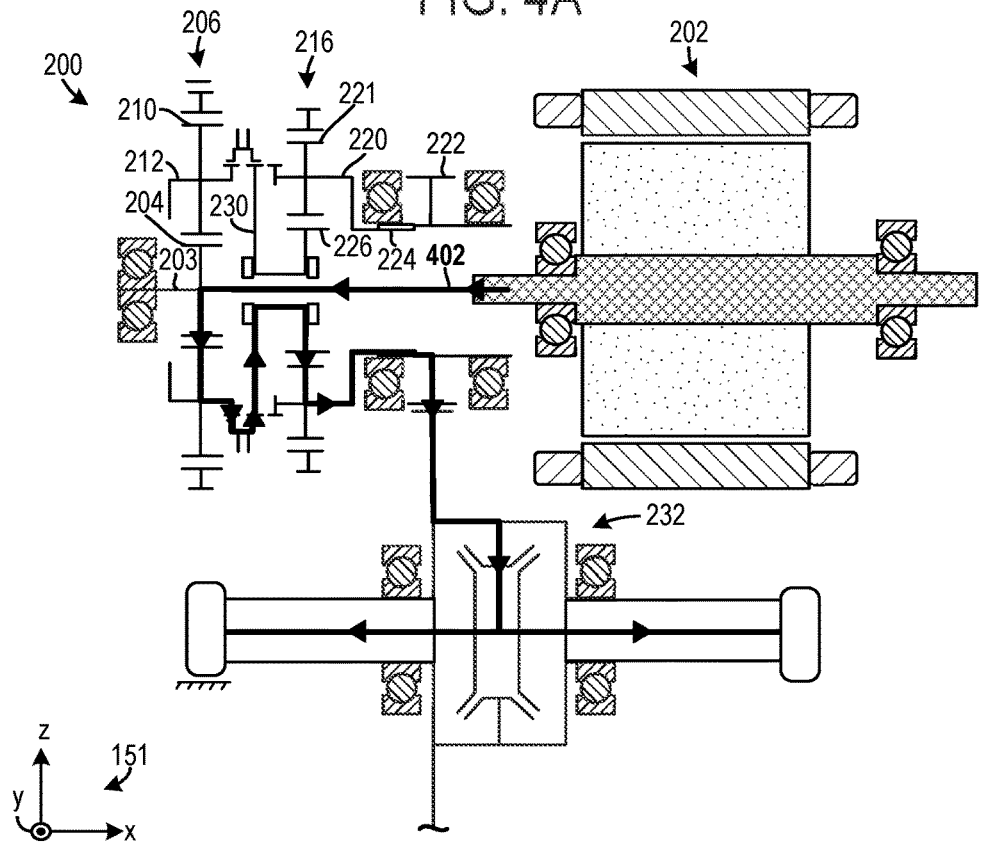
Figure 5:
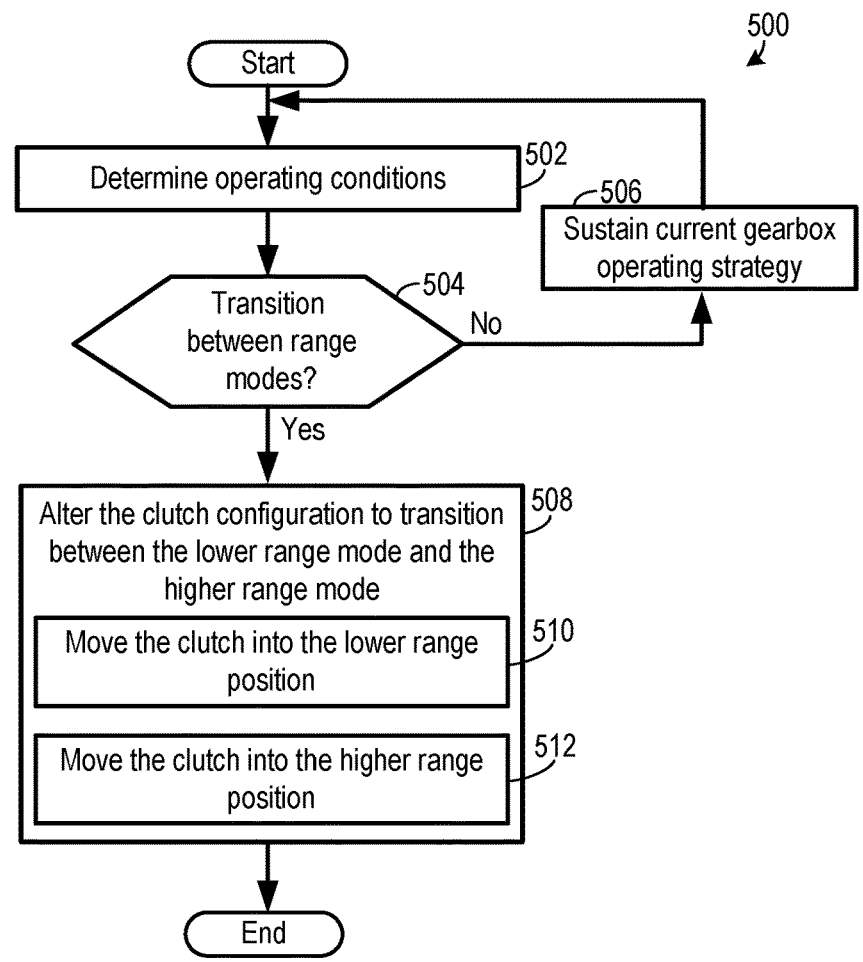
FIG. 5 shows a method for controlling a gearbox system.
Figure 6:
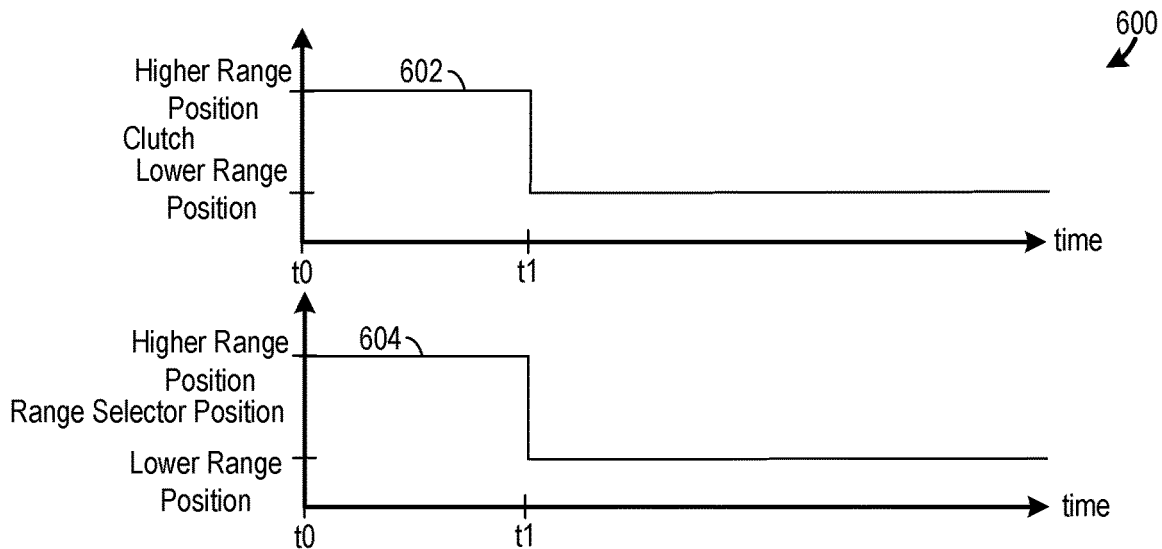
FIG. 6 shows a timing diagram of a use-case gearbox control strategy.

FIG. 1 schematically illustrates a vehicle with a first example of an electric drive axle with a higher and a lower range operating modes. FIG. 2 schematically illustrates a second example of an electric drive axle that again includes a higher and lower range operating modes. FIGS. 3A-3B illustrate the power paths, in the electric drive axle depicted in FIG. 1, in the higher range operating mode and the lower range operating mode, respectively, enabling the use of the vehicle in which the drive axle is deployed in a number of different operating environments. FIG. 3C depicts a chart corresponding to the configurations of the clutches in the different gears in the gearbox system. FIGS. 4A-4B illustrate the power paths, in the electric drive axle depicted in FIG. 2, in the higher range operating mode and the lower range operating mode, respectively. FIG. 5 shows a method for switching between range modes of the gearbox. FIG. 6 illustrates a timing diagram for a use-case gearbox operating strategy for transitioning between a higher range mode and a lower range mode.

FIG. 1 shows a vehicle 100 with a powertrain 102. The vehicle 100 is an electric vehicle (EV) such as an all-electric vehicle (e.g., a battery electric vehicle) or a hybrid electric vehicle. In the hybrid vehicle embodiment an engine may be included in the powertrain (e.g., an engine may provide mechanical power to a drive axle that is separate from the electric drive axle, elaborated upon herein) and in the all-electric vehicle embodiment an engine may be omitted from the powertrain.

The powertrain 102 includes an electric drive axle 104 with an electric machine 108 (e.g., an electric motor-generator) and a gearbox 106. The gearbox 106 is designed to operate in a lower range mode and a higher range mode. Thus, in the lower range mode, the gear ratio of the gearbox may be suitable for lower speed/higher torque operation such as in off-road environments. Conversely, in the higher range mode, the gear ratio of the gearbox may be suitable for higher speed/lower torque operation such as for on-road travel use. It will be appreciated that the stick diagram of FIG. 1 provides a topology of the vehicle, transmission, and corresponding components.

The electric drive axle may be a beam axle. A beam axle may be an axle with mechanical components structurally supporting one another and extending between drive wheels. For instance, the beam axle may be a structurally continuous axle spanning the drive wheels on a lateral axis, in one embodiment. Thus, wheels coupled to the axle may move in unison when articulating, during, for example, vehicle travel on uneven road surfaces. The beam axle may be coupled to a dependent suspension system, in one example. In such an example, the camber angle of the wheels may remain substantially constant as the suspension moves through its travel.

The electric machine 108 is electrically coupled to an energy storage device 110 (e.g., traction battery, capacitor, combinations thereof, and the like) via an inverter 112, for example. As such, the electric machine 108 may be an alternating current (AC) electric machine, in one example. However, in other examples, the electric machine may be a direct current (DC) electric machine and the inverter may therefore be omitted from the powertrain, in such an example. Arrows 114 signify the energy transfer between the electric machine 108, the inverter 112, and the energy storage device 110 that may occur during different modes of system operation. The electric machine 108 may include conventional components for generating rotational output (e.g., forward and reverse drive rotational output) and/or electrical energy for recharging the energy storage device 110 such as a rotor 116 electromagnetically interacting with a stator 118, to provide the aforementioned energy transfer functionality.

The electric machine 108 includes a rotor shaft 120 with a first bearing 122 and a second bearing 124 coupled thereto. The bearings 122, 124 as well as the other bearings described herein may include components such as inner races, outer races, roller elements (e.g., ball bearings, cylindrical rollers, tapered cylindrical rollers, and the like). It will be appreciated that the size and/or construction of the bearings may be selected based on expected rotational speeds of the components to which they are attached, packaging constraints, and the like. As such, the size and/or configuration of at least a portion of the bearings may vary, in some cases. However, at least a portion of the bearings may have similar sizes and/or constructions.

The bearings 122, 124 are shown positioned external to the rotor 116. However, other bearing arrangements with regard to the electric machine have been contemplated such as arrangements with alternative quantities, types, and/or locations of bearings.

The rotor shaft 120 is rotationally coupled (e.g., directly rotationally coupled) to a shaft 126 in the gearbox 106. Directly rotationally coupling the rotor shaft to the gearbox shaft enables the system's compactness to be increased.

The shaft 126 may have a bearing 127 coupled thereto to facilitate rotation thereof. A gear 128 may be fixedly coupled to the shaft 126 and therefore rotates therewith. The gear 128 is rotationally coupled to a clutch 130. The clutch 130 is designed to augment the mechanical power path from the gear 128 to a planetary assembly 132. The planetary assembly 132 includes a higher range planetary gear set 134 and a lower range planetary gear set 136. The higher range planetary gear set 134 is designed to provide a higher gear ratio than the lower range planetary gear set. Thus, the higher range planetary gear set 134 may be activated during or in anticipation of higher speed vehicle operation. Conversely, the lower range planetary gear set 136 may be activated during or in anticipation of lower speed vehicle travel. Activation of these gear sets may include directing the mechanical power path therethrough via clutch operation. The power paths and clutch operation are expanded upon herein.

The clutch 130 is designed to operate in a higher range position where a first interface 141 of the clutch 130 passes mechanical power to an interface 138 (e.g., splined interface, toothed interface, and the like). As such, in the higher range position, the first clutch interface 141 mates with the interface 138. From the interface 138 power travels to a sun gear 140 of the higher range planetary gear set 134 via a gear 138 that is coupled to a shaft 142 which extends between the interface 138 and the sun gear 140. As such, the first interface 141 mates (e.g., meshes or otherwise mechanically attaches) with the gear 138, in the higher range position. In this way, mechanical power from the electric machine 108 bypasses the lower range planetary gear set 136. Further, in this higher range configuration, a sun gear 144 of the lower range planetary gear set 136 idles. Conversely, in a lower range position the clutch 130 transfers mechanical power from the gear 128 to the sun gear 144 of the lower range planetary gear set 136 via an interface 146 (e.g., a splined interface, a toothed interface, and the like) that mates with the clutch 130. Specifically, in the lower range configuration, a second interface 148 of the clutch 130 mates (e.g., meshes or otherwise mechanically attaches) the gear 146, thereby facilitating the aforementioned power transfer.

The shaft 126 may extend through openings 150 in the sun gear 140 and the sun gear 144. In this way, the electric machine 108 and the planetary assembly 132 are arranged coaxially. The rotational axes 171 and 173 of the electric machine 108 and the planetary assembly 132, are provided for reference, respectively.

The lower range planetary gear set 136 further includes a ring gear 152, planet gears 154 which rotate on a carrier 156, and the sun gear 144. The higher range planetary gear set 134 further includes a ring gear 158, planet gears 160 which rotate on a carrier 162, and the sun gear 140.

The carrier 156 of the lower range planetary gear set 136 may be coupled to the sun gear 140 of the higher range planetary gear set 134 via a shaft 164. In this way, the higher and lower range planetary gear sets 134 and 136 may be coupled in series. As such, when the lower and higher range gear sets are activated in a lower range operating mode, mechanical power may flow through the lower range planetary gear set 136 and then into the higher range planetary gear set 134 via the sun gear 140.

The carrier 162 of the higher range planetary gear set 134 is rotationally coupled to an output gear 166 via a shaft 168 and/or other suitable mechanical connection. The output gear 166 functions as an output of the gearbox 106 in a drive mode. However, it will be understood that the output gear 166 may transfer mechanical power back into the gearbox during a regeneration mode where mechanical power travels through the gearbox to the electric machine where electrical energy is generated, for example. Bearings 170 may be coupled to the shaft 168 to facilitate rotation of the output gear 166. The output gear 166 is coupled to a differential 172. To elaborate, the output gear 166 may mesh with a gear 174 fixedly coupled or otherwise attached to a case 176 of the differential 172.

The higher range planetary gear set 134 may be positioned axially between the lower range planetary gear set 136 and the output gear 166. In this way, the axle may achieve increased compactness when compared to other planetary arrangements which may position the output gear on an outer axial side 178 of the planetary assembly 132. However, other suitable gear set arrangements may be used, in other examples. Further, the clutch 130 may be positioned on the outer axial side 178 of the gearbox 106 to enable the clutch to be more easily actuated and accessed for installation and repair, for instance.

The differential 172 may include spider gears 180 that mesh with side gears 182. The side gears 182 may be rotationally coupled to axle shafts 184. In turn, the axle shafts 184 are rotationally coupled to drive wheels 186 that are on a drive surface 188. Bearings 189 may support and enable rotation of the differential case 176. The differential may be an open differential, in one example. In other examples, a locking differential, a limited slip differential, or a torque vectoring differential may be used in the gearbox.

The differential 172 may be offset from the gearbox 106 with regard to their axes of rotation. To elaborate, one of the axle shafts 184 may extend along a lateral side 187 of the electric machine 108. In this way, the axle's compactness may be increased, thereby reducing the likelihood of the axle structurally interfering with other vehicle systems. For instance, the suspension system may be more efficiently incorporated into the axle assembly when the electric drive axle's compactness is increased.

The vehicle 100 may further include a control system 190 with a controller 191. The controller 191 includes a processor 192 and memory 193. The memory 193 may hold instructions stored therein that when executed by the processor cause the controller 191 to perform the various methods, control techniques, and the like described herein. The processor 192 may include a microprocessor unit and/or other types of circuits. The memory 193 may include known data storage mediums such as random access memory, read only memory, keep alive memory, combinations thereof, and the like.

The controller 191 may receive various signals from sensors 194 positioned in different locations in the vehicle 100 and the gearbox 106. The sensors may include an electric machine speed sensor 195, an energy storage device state of charge sensor 196, wheel speed sensors 197, a gearbox speed sensor, and the like. The controller 191 may also send control signals to various actuators 198 coupled at different locations in the vehicle 100 and the gearbox system 106. For instance, the controller 191 may send signals to the inverter 112 to adjust the rotational speed and/or direction of the electric machine. The controller 191 may also send signals to the clutch 130 to switch the gearbox between higher range operation and lower range operation or vice versa. For instance, the clutch 130 may be placed in the higher range position to place the gearbox 106 in the higher range mode and conversely may be placed in the lower range position to place the gearbox in the lower range mode. Further, as previously discussed, the clutch may be placed in a neutral position to interrupt power flow through the gearbox. Actuators (e.g., hydraulic actuators, pneumatic actuators, electromechanical actuators, combinations thereof, and the like) in the clutch may be used to adjust the clutch. The other controllable components in the vehicle and the electric drive axle may function in a similar manner with regard to command signals and actuator adjustment.

The clutch 130 as well as the other clutches herein (e.g., the clutch 218, shown in FIG. 2) may be hydraulically actuated, pneumatically actuated, electromechanically actuated, and/or mechanically actuated. For instance, in one use-case example, a shift fork may be used to alter the position of the clutch.

The vehicle 100 may also include an input device 199 (e.g., a higher-lower range mode selector, console instrument panel, touch interface, touch panel, keyboard, combinations thereof, and the like). The input device 199, responsive to operator input, may generate range mode command (e.g., a higher range mode command or a lower range mode command). For instance, the input device may be a button, a switch, a slider, and the like that enables the operator to toggle between a higher range mode and a lower range mode. As such, in one use-case scenario the operator may switch to the lower range mode when the vehicle is traveling into or anticipated to travel into an off-road environment. Conversely, the operator may switch to the higher range mode when the vehicle is traveling on or anticipated to travel along roads that enable higher speed travel (e.g., paved roads such as highways, freeways, and the like). However, in other examples, the electric drive axle may be switched between the higher range mode and the lower range mode in a more automated manner using operating conditions that may be ascertained from sensor inputs and/or modeling. For instance, the axle may be switched between the higher and lower range drive modes based on vehicle speed, gearbox load, vehicle traction, electric machine speed, and the like. The control system 190 and associated components may be used to control the other electric drive axles described herein. As such, redundant description is forgone for concision.

The gearbox 106 may also be operated in a regeneration mode and a reverse mode. In the regenerative mode, energy is extracted from the gearbox using the electric machine 108 and transferred to the energy storage device 110, for example. For instance, the electric machine 108 may be placed in a generator mode where at least a portion of the rotational energy transferred from the drive wheels to the generator by way of the transmission is converted into electrical energy.

The gearbox 106 described herein with regard to FIG. 1 is able to achieve a selectable higher range mode and a lower range mode in a compact package, thereby enabling the vehicle employing the gearbox to be used in a wider variety of operating environments and driving scenarios. Due to the drive axle's expanded applicability, customer appeal is increased.

An axis system 151 is provided in FIG. 1, as well as FIGS. 2-4B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Rotational axes 153 of the axle shafts 184 are further provided for reference.

FIG. 2 shows another example of an electric drive axle 200. The electric drive axle 200 again includes an electric machine 202 and a gearbox 201. The electric machine 202 may be similar in structure and function to the electric machine 108, shown in FIG. 1. As such redundant description is omitted for concision. The electric machine 202 is coupled to an input shaft 203.

A sun gear 204 resides on the shaft 203 and therefore rotates therewith. The sun gear 204 is included in a higher range planetary gear set 206 which is included in a planetary assembly 208. The higher range planetary gear set 206 includes planet gears 210 which rotate on a carrier 212 and mesh with a ring gear 214. The planetary assembly 208 further includes a lower range planetary gear set 216. A clutch 218 is designed to adjust the mechanical connection between the higher range planetary gear set 206 and the lower range planetary gear set 216. As such, the clutch 218 may be a multi-position dog clutch. To expound, the clutch 218, in a higher range positon may mechanically couple the carrier 212 to a carrier 220 in the lower range planetary gear set 216. The lower range planetary gear set 216 further includes planet gears 221. In the higher range position as well as the lower range position, an interface 219 in the clutch 218 mates with an interface 223 (e.g., splined surface, toothed surface, and the like) coupled to the carrier 212. Further, in the higher range position, an interface 225 in the clutch 218 mates with an interface 227 (e.g., a splined surface, toothed surface, and the like) on the carrier 220.

The carrier 220 is coupled to an output gear 222 via a shaft 224 or other suitable mechanical connection. Thus, in the higher range position of the clutch, mechanical power travels from carrier and carrier of the higher and lower planetary gear sets. In this way, the lower range planetary gear set may be bypassed with regard to the mechanical power path.

In the lower range position, the clutch 218 mechanically couples the carrier 212 in the higher range planetary gear set 206 to a sun gear 226 of the lower range planetary gear set 216 via the interface 228 (e.g., splined surface, toothed surface) on a shaft 230. To elaborate, the interface 225 in the clutch 218 mates with the interface 228 in the lower range position. As such, in the lower range mode, mechanical power flows from the carrier in the higher range planetary gear set 206 to the sun gear in the lower range planetary gear set 216.

The clutch 218 may further be designed to operate in a neutral position where the lower range planetary gear set 216 is decoupled from the higher range planetary gear set 206. In this way, mechanical power flow through the gearbox 201 can be selectively suspended, if desired.

The output gear 222 is again rotationally coupled to a differential 232. The differential 232 and corresponding components may be similar to the differential 172 and associated components, described above with regard to FIG. 1.

FIGS. 3A-3B depict mechanical power paths 300 and 302, respectively through the electric drive axle 104 operating in the higher range mode and the lower range mode, respectively. FIG. 3C depicts the configuration of the clutch 130. As shown in FIG. 3C, in the lower range mode the clutch is in the lower range position and in the higher range mode, the clutch is in the higher range position. It will be understood, that the clutch 218 may have a similar functionality. In one example, a ratio of the lower range mode may be 2.5-3 times higher than a ratio of the higher range mode. In this way, the gearbox may achieve a targeted ratio in both the lower and higher range modes, allowing the gearbox performance to more aptly suit the vehicle's intended operating environment.

As shown in FIG. 3A, in the higher range mode, the electric drive axle's power path 300 unfolds as follows: power is first transferred from the electric machine 108 to the shaft 126. Next the power path moves from the shaft 126 to the sun gear 144 through the clutch 130 and the shaft 142. Next, the power path travels from the sun gear 140 to the carrier 162 via the planet gears 160. Next, power travels from the carrier 162 to the output gear 166 through the shaft 168. From the output gear 166 the power path moves through the differential 172 and to the drive wheels 186 via the axle shafts 184. The power path from the output gear 166 to the drive wheels 186 unfolds in a similar manner in the lower range mode and repeated description is omitted. In the power path 300 depicted in FIG. 3A, the power bypasses the lower range planetary gear set 136 and flows to the higher range planetary gear set 134.

As shown in FIG. 3B, in the lower range mode, the electric drive axle's power path 302 unfolds as follows: power is first transferred from the electric machine 108 to the shaft 126. Next the power path moves from the shaft 126 to the sun gear 144 through the clutch 130. Next power travels to the carrier 156 via the planet gears 154. From the carrier 156, power travel to the sun gear 144 via the shaft 164. From the sun gear 144, power travels to the carrier 162 via the planet gears 160. Next power travels from the carrier 162 to the output gear 166 via the shaft 168. In this way, power flows through the lower range planetary gear set 136 and then to the higher range planetary gear set 134, in series, thereby achieving a lower ratio reduction, when compared to the higher range mode.

FIGS. 4A-4B depict mechanical power paths 400 and 402, respectively through the electric drive axle 200 operating in the higher range mode and the lower range mode, respectively.

As shown in FIG. 4A, in the higher range mode, the electric drive axle's power path 400 unfolds as follows: power is transferred from the electric machine 202 to the shaft 203. Next, power travels from the shaft 203 to the sun gear 204. From the sun gear 204, power travels to the carrier 212 via the planet gears 210. From the carrier 212, the power travels to the carrier 220 by way of the clutch 218. From the carrier 220 power then travels to the output gear 222 and then to the differential 232. In this way, power travels through the higher range planetary gear set 206 and then bypasses the lower range planetary gear set 216.

As shown in FIG. 4B, in the lower range mode, the electric drive axle's power path 402 unfolds as follows: power is transferred from the electric machine 202 to the shaft 203. Next, power travels from the shaft 203 to the sun gear 204. From the sun gear 204, power travels to the carrier 212 via the planet gears 210. From the carrier 212, the power travels through the clutch 218 to the sun gear 226 by way of the shaft 230. Next, power travels from the sun gear 226 to the planet gears 221 and then to the carrier 220. From the carrier 220, power travels to the shaft 224 and then to the output gear 222. From the output gear 222, power travels to the differential 232. In this way, mechanical power travels through the higher gear planetary gear set 206 and the lower ratio planetary gear set 216, in series.

FIG. 5 shows a method 500 for operation of an electric drive axle. The method 500 specifically corresponds to operation of the electric drive axle 104, shown in FIGS. 1 and 3A-3B. However, the method 500 may be carried via other suitable electric drive axles, in other examples, such as the electric drive axle 200, shown in FIGS. 2 and 4A-4B. Furthermore, the method 500 may be implemented by a controller that includes a processor and memory, as previously discussed.

At 502, the method includes determining operating conditions. The operating conditions may include input device position (e.g., range selector position), clutch configuration, gearbox speed, electric machine speed, vehicle speed, vehicle load, ambient temperature, and the like. The operating conditions may be ascertained via sensor inputs, modeling, look-up tables, and other suitable techniques.

Next at 504, the method judges whether to transition between a higher and lower range operating mode. Such as determination may be carried out responsive to driver input. For instance, the driver may interact with a range selector (e.g., a button, switch, touch interface, and the like) or other suitable input device to transition the gearbox into a higher range mode or a lower range mode. However, automatic range mode selection may be used, in other examples. For instance, the controller may automatically transition into the gearbox into the higher range mode or the lower range mode based on vehicle speed and/or vehicle load.

If it is determined that a transition between the higher range mode and the lower range mode should not occur (NO at 504) the method moves to 506, where the method includes sustaining the current gearbox operating strategy. For instance, the gearbox may be sustained in the higher range mode or the lower range mode. As such, the clutch may be held in its current position.

If it is determined that a transition between the higher range mode and the lower range mode should occur (YES at 504) the method moves to 508. At 508, the method includes altering the clutch configuration to transition the gearbox between the lower range mode and the higher range mode. Step 508 may therefore include at 510 moving the clutch into the lower range position to transition the gearbox from the higher range mode to the lower range mode. Conversely, to transition the gearbox from the lower range mode to the higher range mode, the method may include at 512, moving the clutch into the higher range position. In this way, the electric drive axle can be efficiently switched between higher range and lower range operation.

FIG. 6 illustrates a timing diagram 600 of a use-case control strategy for an electric drive axle, such as the electric drive axle 104 shown in FIGS. 1 and 3A-3B or the gearbox shown in FIGS. 2 and 4A-4B. In each graph of the timing diagram, time is indicated on the abscissa and increases from left to right. The ordinates for plots 602 indicate the operational states (i.e., "Higher Range Position" and "Lower Range Position") of the clutch (e.g., the clutch 130, shown in FIG. 1, or the clutch 218, shown in FIG. 2). The ordinate for plot 604 indicate the range selector position (i.e., "Higher Range Position" and "Lower Range Position").

At t1, the range selector position is toggled from the higher range position to the lower range position. Responsive to the operator induced range selector toggling, the clutch is placed in the lower range position. As such, the gearbox is placed in the higher range operating mode. In this way, the gearbox may efficiently transition between the lower range and higher range, thereby expanding the gearbox's adaptability.

The technical effect of the electric drive axles and operating methods described herein is to expand the gearbox's functionality and increase the axle's capability with regard to operating range and driving environment, correspondingly.

FIGS. 1-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric drive axle is provided that, comprises an electric machine rotationally coupled to a gearbox, the gearbox comprising: a higher range planetary gear set coupled to a lower range planetary gear set via a clutch; wherein the clutch is configured to: selectively rotationally couple an input gear to a sun gear in each of the higher range planetary gear set and the lower range planetary gear set in different positions; or selectively rotationally couple a carrier in the higher range planetary gear set to a carrier and a sun gear in the lower range planetary gear set in different positions.

In another aspect, a method for operation of an electric drive axle is provided that comprises operating a clutch in a gearbox to transition the gearbox between a higher range mode and a lower range mode; wherein the electric drive axle comprises: a higher range planetary gear set selectively coupled to a lower range planetary gear set in series via a clutch; wherein in the higher range mode, mechanical power from an electric machine bypasses the lower range planetary gear set; and wherein in the lower range mode, mechanical power from the electric machine travels through the lower range planetary gear set and the higher range planetary gear set.

In yet another aspect, an electric drive axle in an all-electric vehicle is provided that comprises an electric machine rotationally coupled to and coaxial to a gearbox, the gearbox comprising: a higher range planetary gear set coupled to a lower range planetary gear set via a clutch an output gear designed to receive rotational input from at least one of the higher range planetary gear set and the lower range planetary gear set; wherein the clutch is configured to: in a lower range position, direct mechanical power through the higher range planetary gear set and the lower range planetary gear set; in a higher range position, direct mechanical power to the higher range planetary gear set which bypasses the lower range planetary gear set.

In any of the aspects or combinations of the aspects, the higher and lower range planetary gear sets and the electric machine may be coaxial.

In any of the aspects or combinations of the aspects, the clutch may be a dog clutch.

In any of the aspects or combinations of the aspects, the higher range planetary gear set may be a simple planetary gear set.

In any of the aspects or combinations of the aspects, the lower range planetary gear set may be a simple planetary gear set.

In any of the aspects or combinations of the aspects, the electric machine may be directly coupled to the gearbox and is coaxial to the higher range planetary gear set and the lower range planetary gear set.

In any of the aspects or combinations of the aspects, the carrier of the higher range planetary gear set may be coupled to an output gear of the gearbox.

In any of the aspects or combinations of the aspects, the output gear may be directly coupled to a differential.

In any of the aspects or combinations of the aspects, the output gear may be directly coupled to a differential.

In any of the aspects or combinations of the aspects, the electric drive axle may further comprise a controller including instructions stored in memory executable by a processor that during a first operating condition cause the controller to: operate the gearbox in a higher range mode where mechanical power from the electric machine flows through the lower range planetary gear set and the higher range planetary gear set in series.

In any of the aspects or combinations of the aspects, the controller may further comprise instructions stored in memory executable by the processor that during a second operating condition cause the controller to: operate the gearbox in a lower range mode where mechanical power from the electric machine bypasses the lower range planetary gear set and travels to the higher range planetary gear set.

In any of the aspects or combinations of the aspects, a ratio of the lower range mode may be 2.5-3 times higher than a ratio of the higher range mode.

In any of the aspects or combinations of the aspects, the clutch may be operated to transition the gearbox between the higher range mode and the lower range mode is initiated in response to operator induced mode selection adjustment command.

In any of the aspects or combinations of the aspects, the clutch may rotationally couple an input gear to a sun gear of the lower range planetary gear set in the lower range mode and rotationally couples the input gear to a sun gear in the higher range planetary gear set in the higher range mode.

In any of the aspects or combinations of the aspects, the clutch may rotationally couple a carrier in the lower range planetary gear set to a carrier in the higher range planetary gear set in the lower range mode and rotationally couples the carrier in the higher range planetary gear set to a sun gear in the lower range planetary gear set in the higher range mode.

In any of the aspects or combinations of the aspects, the electric drive axle may further comprise a controller including instructions stored in memory executable by a processor that during a first operating condition cause the controller to: operate the gearbox in a higher range mode where mechanical power from the electric machine flows through the lower range planetary gear set and the higher range planetary gear set in series; and operate the gearbox in a lower range mode where mechanical power from the electric machine bypasses the lower range planetary gear set and travels to the higher range planetary gear set.

In any of the aspects or combinations of the aspects, the controller may further comprise instructions stored in the memory that when executed in response to receiving an operator induced higher range mode selection command, cause the controller to: move the clutch into the higher range position.

In any of the aspects or combinations of the aspects, the higher and lower range planetary gear sets may each be simple planetary gear sets.

In another representation, a range selectable gearbox in an all-electric drive system is provided that comprises a range selector clutch that operates in higher range configuration where the clutch transfers power to a higher range planetary gear set which bypasses a lower range planetary gear set and a lower range configuration where the clutch transfers power to the lower range planetary gear set and the higher range planetary gear set in series.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. The specific routines described herein may represent one or more of multiple processing strategies. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines. The subject matter of the present disclosure includes all novel and non-obvious combinations and sub-combinations of the various systems and configurations, and other features, functions, and/or properties disclosed herein. While various embodiments have been described above, it should be understood that they have been presented by way of example, and not limitation. The embodiments described above are therefore to be considered in all respects as illustrative, not restrictive.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive axle, comprising:
an electric machine rotationally coupled to a gearbox, the gearbox comprising:
a clutch selectively coupled to a first planetary gear set and a second planetary gear set;
wherein the clutch is configured to:
in a first position corresponding to a lower gear ratio mode, rotationally couple a carrier in the first planetary gear set to a carrier in the second planetary gear set; and
in a second position corresponding to a higher gear ratio mode, rotationally couple the carrier in the first planetary gear set to a sun gear in the second planetary gear set; and
wherein the carrier of the second planetary gear set is coupled to an output gear of the gearbox.

2. The electric drive axle of claim 1, wherein the first and second planetary gear sets are coaxially arranged.

3. The electric drive axle of claim 2, wherein the electric machine and the first and second planetary gear sets are coaxially arranged.

4. The electric drive axle of claim 1, wherein the clutch is a multi-position dog clutch.

5. The electric drive axle of claim 1, wherein at least one of the first and second planetary gear sets is a simple planetary gear set.

6. The electric drive axle of claim 1, wherein the output gear is directly coupled to a differential.

7. The electric drive axle of claim 6, wherein a rotational axis of the differential is parallel to a rotational axis of the electric machine.

8. The electric drive axle of claim 1, further comprising a controller including instructions stored in memory that when executed cause the controller to:
transition the gearbox between the higher gear ratio mode and the lower gear ratio mode.

9. The electric drive axle of claim 8, wherein the gearbox is transitioned between the higher gear ratio mode and the lower gear ratio mode based on operator interaction with a range mode selector.

10. The electric drive axle of claim 8, wherein the gearbox is transitioned between the higher gear ratio mode and the lower gear ratio mode based on vehicle speed and/or load.

11. The electric drive axle of claim 1, wherein the electric machine is an electric motor-generator.

12. The electric drive axle of claim 1, wherein the electric drive axle is a beam axle.

13. The electric drive axle of claim 1, wherein the clutch is the only clutch in the gearbox.

14. A method for operation of an electric drive axle, comprising:
operating a clutch in a gearbox to transition the gearbox between a higher gear ratio mode and a lower gear ratio mode;
wherein the electric drive axle comprises:
an electric machine rotationally coupled to the gearbox, the gearbox comprising:
the clutch selectively coupled to a first planetary gear set and a second planetary gear set; and
wherein the clutch is configured to:
in a lower gear ratio position, rotationally couple a carrier in the first planetary gear set to a carrier in the second planetary gear set; and
in a higher gear ratio position, rotationally couple the carrier in the first planetary gear set to a sun gear in the second planetary gear set; and
wherein the clutch is the only clutch in the gearbox.

15. The method of claim 14, wherein the clutch is a dog clutch.

16. An electric drive axle, comprising:
an electric motor rotationally coupled to a gearbox, the gearbox comprising:
a first planetary gear set arranged coaxial to a second planetary gear set; and
a clutch configured to:
in a first position corresponding to a higher gear ratio mode, rotationally couple an input gear to a sun gear in the first planetary gear set and rotationally decouple the input gear from a sun gear in the second planetary gear set; and
in second position corresponding to a lower gear ratio mode, rotationally couple the input gear to the sun gear in the second planetary gear set and rotationally decouple the sun gear in the first planetary gear set from the input gear.

17. The electric drive axle of claim 16, further comprising a differential rotationally coupled to the first planetary gear set, wherein a rotational axis of the differential is parallel to a rotational axis of the electric motor.

18. The electric drive axle of claim 16, wherein the clutch is a dog clutch.

19. The electric drive axle of claim 16, wherein the gearbox includes an output gear coupled to a carrier of the first planetary gear set.

* * * * *